(12) United States Patent
Jenkins (10) Patent No.: US 11,162,679 B2
(45) Date of Patent: *Nov. 2, 2021

(54) QUICK-DISCONNECT GAS PIPELINE (71) Applicant: GHP Group, Inc., Niles, IL (US)

(72) Inventor: Cameron Jenkins, Antioch, CA (US)

(73) Assignee: GHP Group, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,152

(22) Filed: Dec. 17, 2019

(65) Prior Publication Data
US 2020/0132301 A1    Apr. 30, 2020

Related U.S. Application Data

(63) Continuation of application No. 15/925,392, filed on Mar. 19, 2018, now Pat. No. 10,520,188, which is a continuation of application No. 15/586,626, filed on May 4, 2017, now Pat. No. 9,958,156.

(30) Foreign Application Priority Data

Aug. 12, 2016    (CN) .......................... 2016208712140

(51) Int. Cl.
| | |
|---|---|
| *F23K 5/00* | (2006.01) |
| *F23D 14/28* | (2006.01) |
| *F16L 37/08* | (2006.01) |
| *F23N 1/00* | (2006.01) |

(52) U.S. Cl.
CPC .............. *F23K 5/007* (2013.01); *F16L 37/08* (2013.01); *F23D 14/28* (2013.01); *F23N 1/007* (2013.01); *F23K 2203/10* (2013.01); *F23K 2400/20* (2020.05)

(58) Field of Classification Search
CPC .......... F24C 15/08; F24C 15/086; F24C 3/00; F23K 2203/10; F23K 5/0107; F23K 5/007; F16L 37/08; F16L 37/0841; A47J 37/0781; A47J 37/0682; F24B 1/18
USPC ...................................... 126/512, 39 B, 41 R
See application file for complete search history.

(56) References Cited

U.S. PATENT DOCUMENTS

| | | |
|---|---|---|
| 2,535,500 A | 12/1950 | Looft |
| 3,213,848 A | 10/1965 | Tohchung |
| 3,498,284 A | 3/1970 | Swaddey |
| 3,667,449 A | 6/1972 | Persinger |

(Continued)

FOREIGN PATENT DOCUMENTS

| | | | |
|---|---|---|---|
| DE | 30294754 A1 | 3/1982 | |
| GB | 295513 A * | 8/1928 | ............... F24C 3/00 |

(Continued)

OTHER PUBLICATIONS

Extended European Search Report for EP App. No. 17186038, dated Dec. 11, 2017, 8 pages.

*Primary Examiner* — David Bochna
(74) *Attorney, Agent, or Firm* — Seyfarth Shaw LLP (57) ABSTRACT

A quick-disconnect gas pipeline comprises a quick-disconnect device (QDD) which comprises a QDD male end and a QDD female end, and a gas hose. The QDD male end is connected to the gas pipeline inside the heating system and the QDD female end is connected to the gas hose outside the heating system. When the heating system is not used, it is easy to disconnect the QDD to prevent people from tripping over the long gas pipeline.

10 Claims, 7 Drawing Sheets

(56) References Cited

U.S. PATENT DOCUMENTS

| | | | |
|---|---|---|---|
| 3,745,303 A | 7/1973 | Epperson | |
| 3,959,620 A | 5/1976 | Stephen, Jr. | |
| 3,987,779 A | 10/1976 | Richardson | |
| 4,679,544 A | 7/1987 | Koziol | |
| 4,779,608 A | 10/1988 | Smith | |
| 4,891,005 A | 1/1990 | Carter | |
| 5,094,223 A | 3/1992 | Gonzalez | |
| 5,158,067 A | 10/1992 | Dutro | |
| 5,168,796 A | 12/1992 | Porton | |
| 5,222,475 A | 6/1993 | Greener | |
| 5,370,527 A * | 12/1994 | Hefling | F24C 5/18 431/247 |
| 5,868,128 A * | 2/1999 | Omar | F24C 3/006 126/305 |
| 5,890,485 A | 4/1999 | Shimek | |
| 5,931,661 A | 8/1999 | Kingery | |
| 6,065,466 A | 5/2000 | Baykal | |
| 6,192,881 B1 | 2/2001 | Nix | |
| 6,227,843 B1 | 5/2001 | Pedersen | |
| 6,354,288 B1 | 3/2002 | McDonald | |
| 6,725,856 B1 | 4/2004 | Barbour | |
| 9,675,171 B2 | 6/2017 | Kahler | |
| 9,958,156 B2 | 5/2018 | Jenkins | |
| 10,240,796 B1 * | 3/2019 | Stilwell | F24B 1/191 |
| 10,520,188 B2 * | 12/2019 | Jenkins | F16L 37/08 |
| 2003/0145848 A1 | 8/2003 | Butler | |
| 2003/0164167 A1 | 9/2003 | Van Vleet | |
| 2003/0188735 A1 | 10/2003 | Yang | |
| 2005/0089812 A1 | 4/2005 | Van Vleet | |
| 2005/0109332 A1 | 5/2005 | Li | |
| 2005/0268902 A1 | 12/2005 | Mosher, II | |
| 2008/0110870 A1 | 5/2008 | Mirkes | |
| 2015/0068512 A1 * | 3/2015 | Mehler | A47J 37/067 126/25 R |
| 2015/0250305 A1 * | 9/2015 | Kahler | F23D 14/28 108/50.13 |

FOREIGN PATENT DOCUMENTS

| | | |
|---|---|---|
| GB | 2334328 A | 8/1999 |
| GB | 2484272 | 4/2012 |
| WO | WO 01/79740 A1 | 10/2001 |
| WO | WO 2013/160790 A1 | 10/2013 |

* cited by examiner

QUICK-DISCONNECT GAS PIPELINE

CROSS REFERENCE TO RELATED APPLICATIONS

This Application is a continuation of and claims priority to U.S. application Ser. No. 15/925,392 filed on Mar. 19, 2018 (now U.S. Pat. No. 10,520,188), which claims priority to U.S. application Ser. No. 15/586,626 filed on May 4, 2017 (now U.S. Pat. No. 9,958,156), which claims priority to Chinese Application No. 2016208712140 which was filed on Aug. 12, 2016, the contents of which are hereby incorporated by reference.

BACKGROUND

1. Technical Field

The disclosure generally relates to a quick-disconnect gas pipeline.

2. Background Art

Heating devices, such as a gas heating stove and table top gas heaters, have existed for many years. Many varieties and adaptations of heating devices have been developed. As society has developed and living standards have increased, outdoor heating devices have become increasingly common.

However, heating devices such as gas heating stoves and table top gas heaters usually need to be connected to an external gas tank to supply gas to the heating unit. Therefore, gas heating stoves or table top gas heaters typically include a long gas pipeline to connect the heating unit with the gas tank. Even when the gas tank is not in use, the long gas pipeline remains connected to the heating unit. Hence, there is a risk of people tripping over the long gas pipeline causing injury and/or damage to the heating device, gas line, or gas tank.

Therefore, a quick-disconnect device is required to easily connect the heating device and the gas tank when the heating device or gas tank needs to be used and/or disconnect the heating device and the gas tank when the heating device or gas tank is not used.

SUMMARY

Here, the disclosed embodiments include a system which can at least partially overcome the above-described disadvantages.

According to at least one exemplary embodiment, a quick-disconnect gas pipeline comprising a quick disconnect device ("QDD"), which comprises a QDD male end and a QDD female end, and a gas hose is provided. The QDD male end is connected to the gas pipeline inside the heating system and the QDD female end is connected to the gas hose outside the heating system.

In another embodiment, the heating system comprises a gas heating stove or gas heating table which comprises a table top and a plurality of legs, and a heating part, wherein one leg of the plurality of legs has a hole through which the gas hose can be coupled with said gas pipeline.

In another embodiment, the heating system comprises a combustion chamber which comprises a base, a table top, and a heating part, wherein said base consists of four solid plates, said four solid plates are connected to a support at each corner, and said QDD male end of said quick-disconnect gas pipeline is fixed onto one solid plate of said four solid plates.

In a further embodiment, when the heating system is not used, said gas hose outside said heating system can be disconnected at said QDD. In addition, said gas hose outside said heating system can be connected at said QDD so that said heating system can be connected to an external gas tank. The connection of said QDD is realized by pulling the safety device outside said QDD female end to put said QDD female end on said QDD male end and then releasing said safety device. The disconnection of said QDD is realized by pulling the safety device outside said QDD female end to remove said QDD female end from said QDD male end and then releasing said safety device.

In a further embodiment, the heating part comprises a brazier, a burner, a gas valve assembly, an ignition component, and a control knob. Said gas valve assembly comprises a gas valve, a nozzle, a thermocouple, and a regulator used for regulating the gas flow. Said ignition component comprises an ignitor and an ignition pin, wherein said ignition pin is connected to said ignitor with a lead and approaches said burner.

Further objects, features, and advantages of the disclosed embodiments will become apparent from the detailed description of the embodiments which follows, when considered with the attached figures.

BRIEF DESCRIPTION OF THE DRAWINGS

The following drawings are included to provide a further understanding of the disclosed embodiments. One or more exemplary embodiments shown in the drawings of the present disclosure together with the description are used to illustrate some principles and operations. In the drawings.

DETAILED DESCRIPTION OF EMBODIMENTS

In the following description, numerous specific details are set forth in order to provide a more thorough description of the disclosed embodiments. It will be apparent, however, to one skilled in the art, that the embodiments disclosed herein may be practiced without these specific details. In other instances, well-known features have not been described in detail so as not to obscure the embodiments of the invention.

Figure 3:
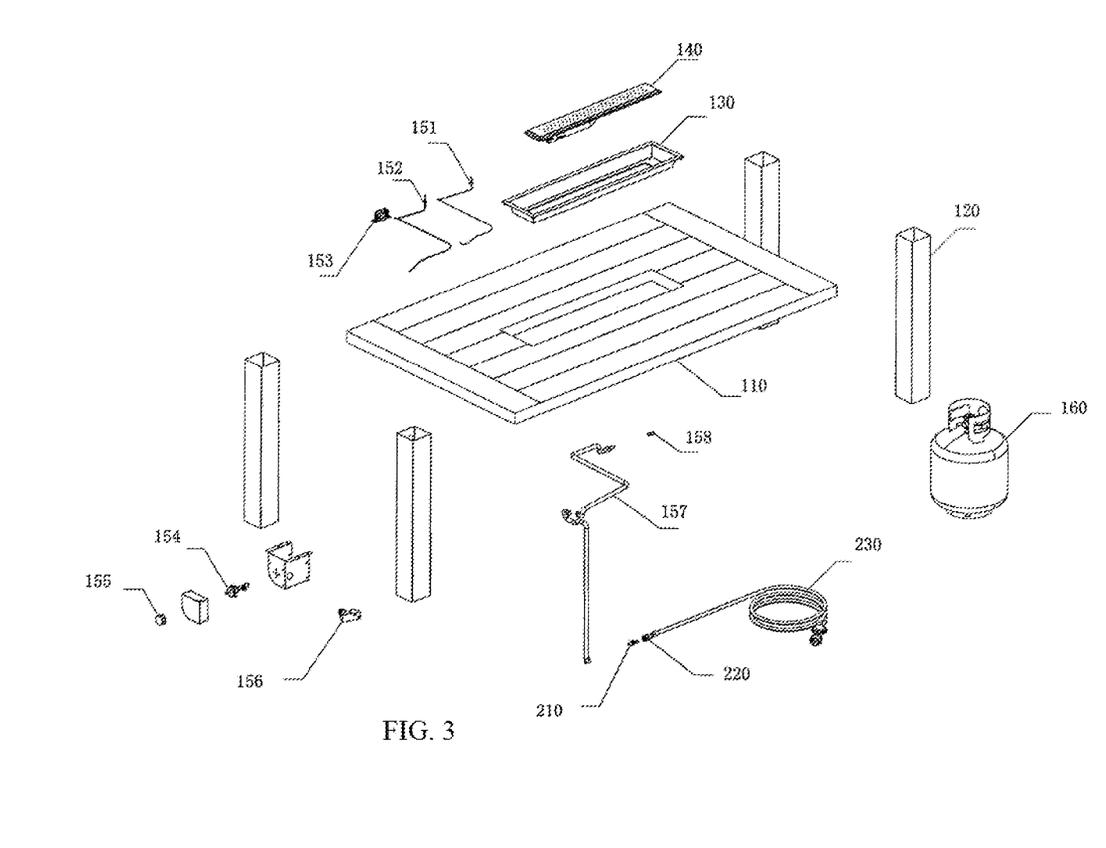
FIG. 3 shows an exploded view of the heating system shown in FIG. 1 and a gas tank.
Figure 4:
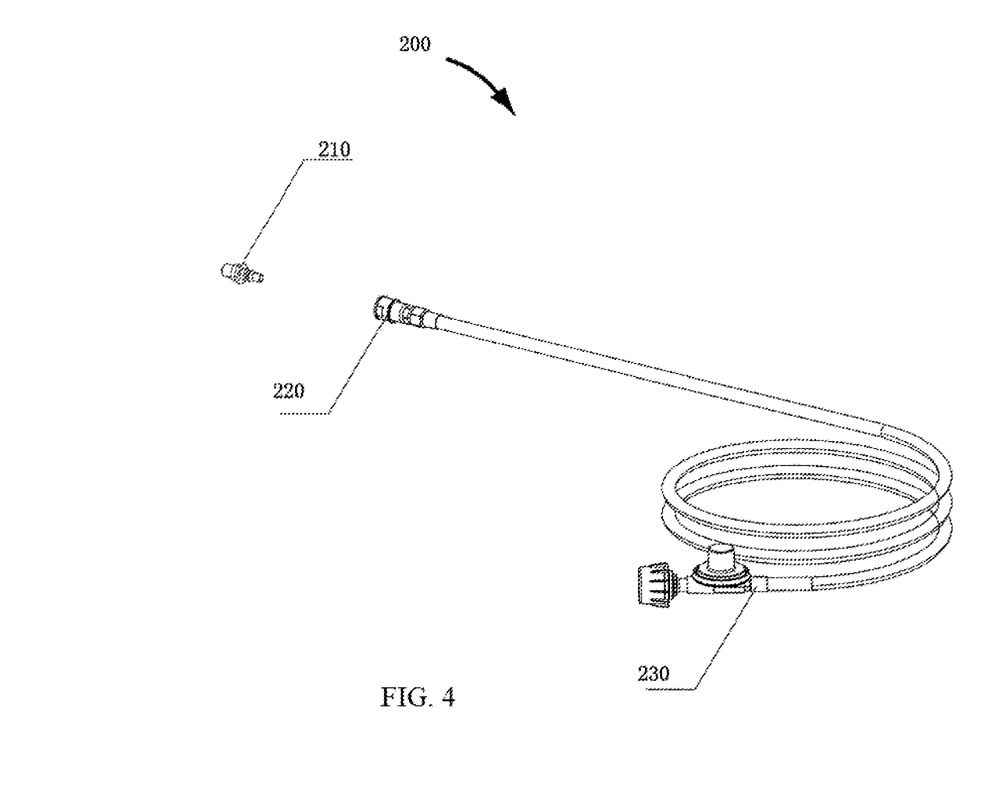
FIG. 4 shows the QDD and the regulator-hose assembly, which can be applied to the heating system shown in FIG. 1, according to one embodiment of the present utility model.

In one embodiment, the present application can provide a quick-disconnect gas pipeline, which, for example, can comprise a quick disconnect device ("QDD") comprising a QDD male end and a QDD female end, and a gas hose, as shown in FIG. 4. The QDD male end is connected to the gas pipeline inside the heating system and the QDD female end is connected to the gas hose outside the heating system. To be specific, the quick-disconnect gas pipeline can be connected to different heating systems such as gas heating stove or gas heating table, and combustion chamber. FIG. 1 to FIG. 3 and FIG. 5A to FIG. 6B show an embodiment where the QDD male end of the quick-disconnect gas pipeline is fixed onto a leg of the heating system such as a gas heating stove or gas heating table, and FIG. 7A to FIG. 8B show another embodiment where the QDD male end of the quick-disconnect gas pipeline is fixed onto a solid plate of the heating system such as a combustion chamber. The following will describe the details of said embodiments in combination with the drawings.

Figure 1:
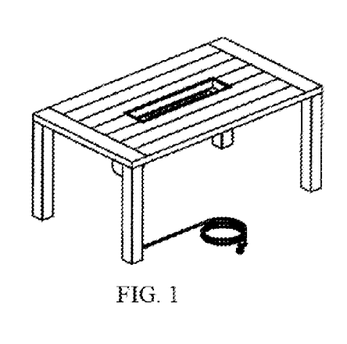
FIG. 1 shows a perspective view of the heating system comprising a gas heating stove or gas heating table in an embodiment of the present utility model, where said heating system is equipped with a gas hose which is connected to the heating system.
Figure 2A:
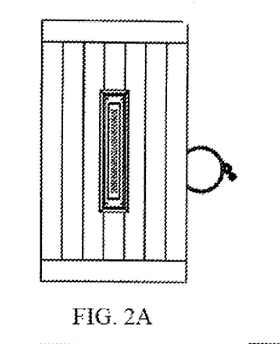
FIG. 2A, FIG. 2B, FIG. 2C, FIG. 2D, FIG. 2E, and FIG. 2F respectively show a top view, rear view, left view, front view, right view, and bottom view of the heating system equipped with a gas hose in FIG. 1.
Figure 2B:
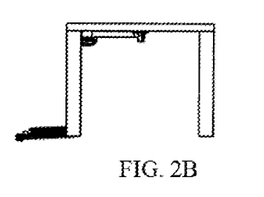
Figure 2C:
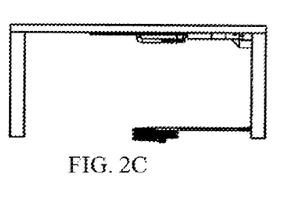
Figure 2D:
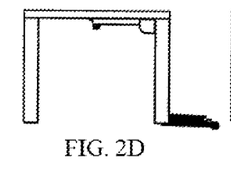
Figure 2E:
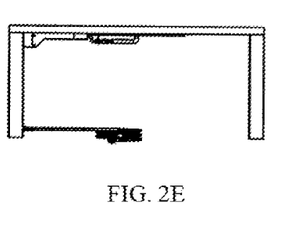
Figure 2F:
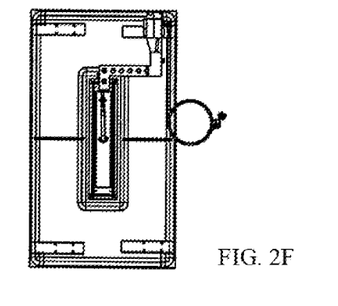

FIG. 1 shows a perspective view of the heating system comprising a gas heating stove or gas heating table equipped with a gas hose connected to the heating system, and FIGS. 2A-2F respectively show a top view, rear view, left view, front view, right view, and bottom view of the heating system shown in FIG. 1. The gas heating stove or gas heating table usually comprises a table equipped with a plurality of legs to support the tabletop, and a heating part accommodated on the tabletop. The table can be in the shape of a square with a rectangular opening at the center, where the opening is configured to accommodate the brazier. The tabletop can be made of a rigid material such as metal or ceramic. As described previously, the tabletop can be connected to the legs by use of different connection methods such as a connector (e.g. a pin). In one embodiment, the legs can be hollow and in the shape of a cylinder. One leg near the place where the heating system is placed has a hole in one side, and the gas pipeline can pass through said hole to reach the heating part to supply gas from an external gas tank to the heating part.

FIG. 3 shows an exploded view of the heating system shown in FIG. 1 and a gas tank 160. The heating system specifically comprises the following structures: a tabletop 110, a plurality of legs 120, a brazier 130, a burner 140, an electrode 151, thermocouple 152, a thermocouple protector 153, a gas control valve 154, a control knob 155, an electronic ignitor 156, a nozzle 158, semi-rigid gas pipeline 157, a QDD, a regulator, and a hose assembly 230. The brazier 130 can be in the shape of a rectangle and is configured to be disposed in the rectangular center opening in the tabletop. Other shapes may also be considered for the brazier. The burner 140 is made of a high-temperature resistant material, for example, a steel alloy. The surface of the burner 140 has a plurality of small holes, and a pipe is directly connected to the burner 140 to receive the gas fuel from the gas tank 160. The burner 140 can also be in the shape of a rectangle, and the bottom of the burner has some lugs which are used to fix the burner onto the brazier 130. In addition, the gas valve 154 can be connected with the thermocouple 152 so as to sense the temperature. When the gas valve 154 is opened, gas can be supplied from the gas tank 160 to the burner 140 for burning. In a disclosed embodiment, the opening of the gas valve 154 can be controlled by a control knob 155. The volume of intake gas can be regulated by controlling the regulator. The ignitor 156 is connected to the ignition pin (not shown in the figure) with a lead. The ignition pin can be located to approach the burner 140 so that the burner 140 can be ignited when the ignitor is activated and the gas valve 154 is opened. The QDD comprises a QDD male end 210 and a QDD female end 220 and will be described in FIG. 4.

FIG. 4 shows the quick-disconnect gas pipeline 200. The quick-disconnect gas pipeline comprises a QDD and a gas hose. As described above, the QDD can be integrated into the gas pipeline and can be connected to the heating system, for example, the heating system shown in FIG. 1. The QDD consists of a QDD male end 210 and a QDD female end 220, wherein the QDD male end 210 can be connected to the gas pipeline 157 inside the heating system (see FIG. 3) and the QDD female end 220 can be connected to the gas hose outside the heating system. The other end of the gas hose is connected to the regulator.

Figure 5A:
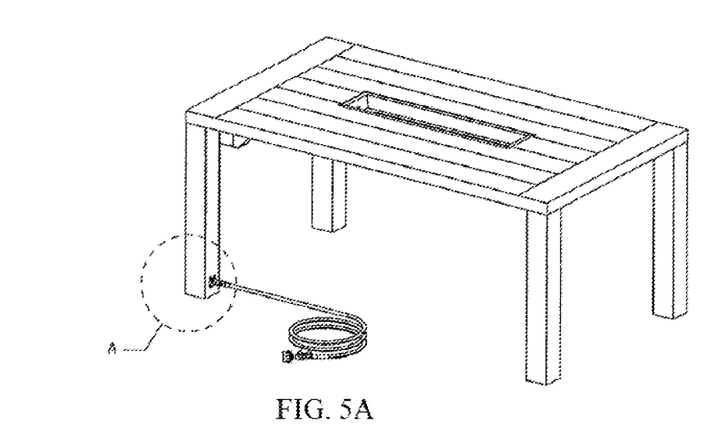
FIG. 5A shows the connection between the heating system and the gas hose with the QDD shown in FIG. 1.
Figure 5B:
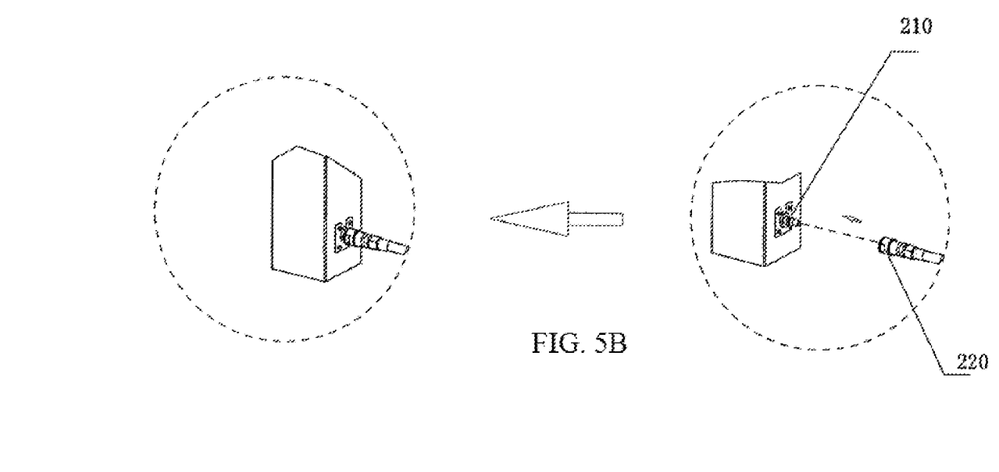
FIG. 5B shows details of the connection between the heating system and the gas hose with the QDD at part A in FIG. 5A.

FIGS. 5A and 5B show in detail the connection between the heating system and the gas hose with the QDD, as shown in FIG. 1. The gas hose outside the heating system can be connected at the QDD so that the heating system can be connected to an external gas tank. To be specific, the QDD male end of the quick-disconnect gas pipeline is fixed onto a leg of the heating system. The connection of said QDD is realized through the following procedure: Pull the safety device outside said QDD female end to put said QDD female end on said QDD male end and then release said safety device, as shown in FIG. 5B.

Figure 6A:
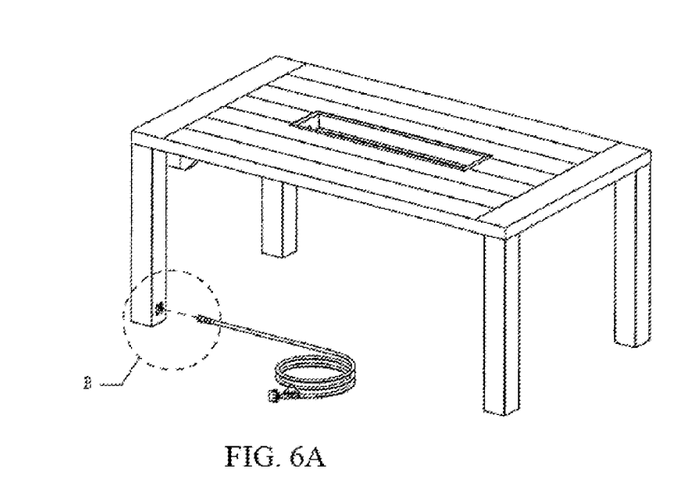
FIG. 6A shows the disconnection between the heating system and the gas hose shown in FIG. 1.
Figure 6B:
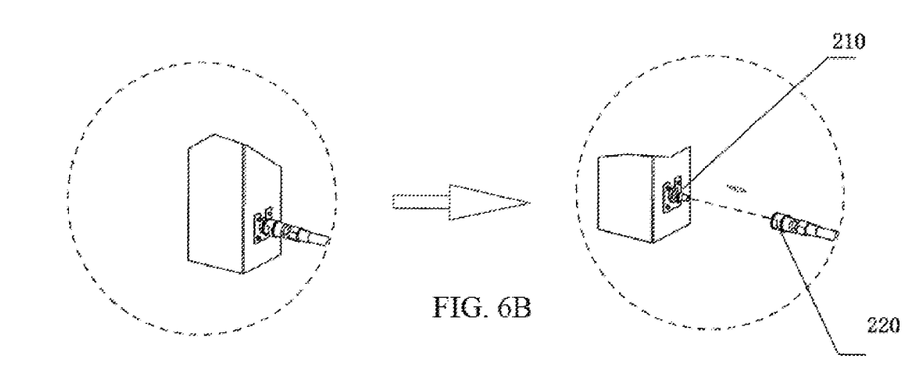
FIG. 6B shows details of the disconnection between the heating system and the gas hose at part B in FIG. 6A.

FIGS. 6A and 6B show in detail the disconnection between the heating system and the gas hose shown in FIG. 1. When the heating system is not used, the gas hose outside the heating system can be disconnected at the QDD for storage. The disconnection of said QDD is realized through the following procedure: Pull the safety device outside said QDD female end to remove said QDD female end from said QDD male end and then release said safety device, as shown in FIG. 6B.

Figures 7A, 7B:
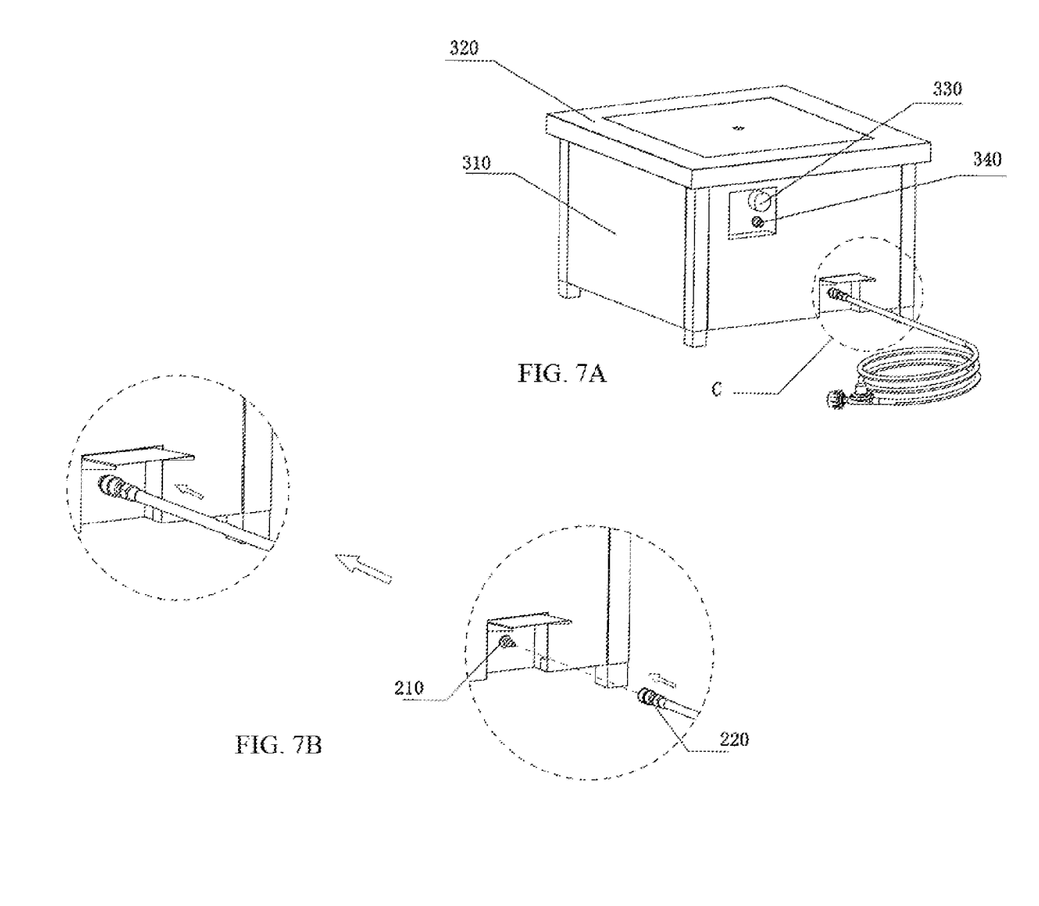
FIG. 7A shows the connection between the heating system and the gas hose with the QDD in another embodiment of the present utility model.
FIG. 7B shows details of the connection between the heating system and the gas hose with the QDD at part C in FIG. 7A.

FIGS. 7A and 7B show in detail the connection between the heating system (for example, combustion chamber) and the gas hose with the QDD in another embodiment. The heating system (for example, combustion chamber) shown in FIG. 7A comprises a base, a table top 320, and a heating part. The heating part comprises, for example, a control knob 330, an ignition component 340, and other components such as brazier, burner, and gas valve assembly (not shown in FIG. 7A). The base consists of four solid plates 310 connected to a support at each corner. The base can be hollow and in the shape of a cylinder, a box, or in other shapes. The table top 320 can be rectangular or form other shapes. The table top 320 is connected to the top of the base, for example at the top of four supports of the base with connectors such as pins and bolts. Other connection methods such as adhesives and welding may also be considered. The center opening, where a brazier, for example, can be placed, may be formed at the center of the table top 320. The control knob 330 can be installed on the solid plate 310 and can be regulated to control the intake gas for burning. The brazier, burner, and gas valve assembly are hidden in the base. The ignition component 340 can also be installed on the solid plate 310 and near the burner for ignition. In a preferred embodiment, the gas valve assembly comprises a gas valve, a nozzle, a thermocouple, and a regulator and is used for regulating the gas flow, and the ignition component comprises an ignitor such as pulse ignitor and an ignition pin, wherein the ignition pin is connected to the ignitor with a lead and approaches the burner.

As described above, the gas hose outside the heating system can be connected at the QDD so that the heating system can be connected to an external gas tank. For the embodiment disclosed in FIG. 7A, the QDD male end of the quick-disconnect gas pipeline is fixed onto a solid plate of the heating system. The connection of the QDD is realized through the following procedure: Pull the safety device outside the QDD female end to put the QDD female end on the QDD male end and then release the safety device, as shown in FIG. 7B.

Figure 8A:
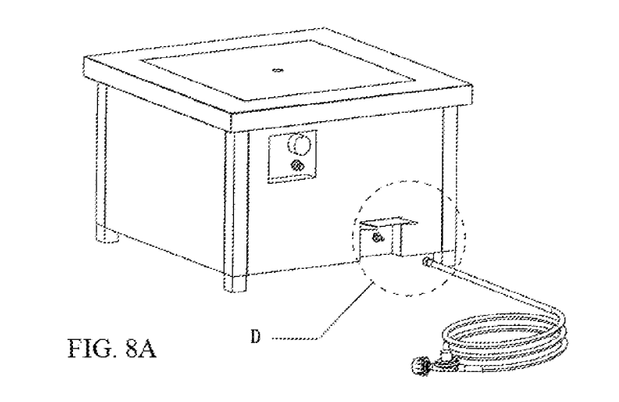
FIG. 8A shows the disconnection between the heating system and the gas hose in another embodiment of the present utility model.
Figure 8B:
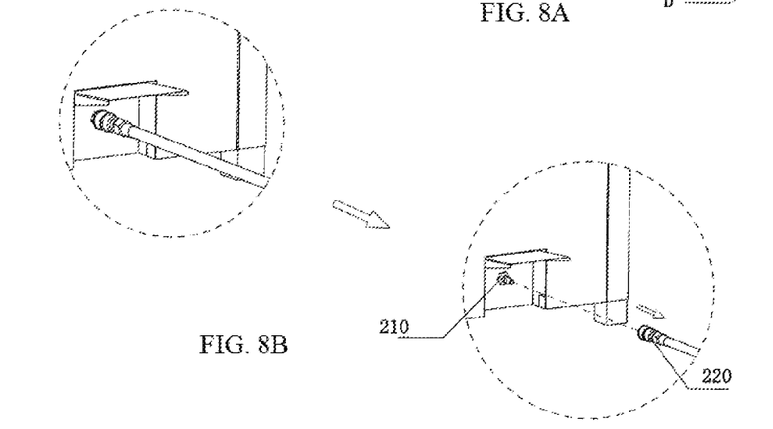
FIG. 8B shows details of the disconnection between the heating system and the gas hose at part D in FIG. 8A.

FIGS. 8A and 8B show in detail the disconnection between the heating system and the gas hose in another embodiment. When the heating system is not used, the gas hose outside the heating system can be disconnected at the QDD for storage. The disconnection of the QDD is realized through the following procedure: Pull the safety device outside the QDD female end to remove the QDD female end from the QDD male end and then release the safety device, as shown in FIG. 8B.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A gas heating table comprising:
   a table top;
   a base extending from the table top, wherein the base includes first and second depressions formed into the base;
   an internal gas pipeline disposed within the base;
   a quick disconnect device ("QDD") disposed in the first depression of the base and including a QDD male end and a QDD female end, wherein one of the QDD male end and the QDD female end is coupled to the internal gas pipeline, and the other of the QDD male end and the QDD female end is coupled to an external gas supply; and
   a control actuator and an ignition component disposed in the second depression.

2. The gas heating table of claim 1, further comprising a heating part coupled to the internal gas pipeline.

3. The gas heating table of claim 2, wherein the heating part is disposed adjacent to the table top.

4. The gas heating table of claim 1, wherein the base is hollow and has a cylindrical shape.

5. The gas heating table of claim 1, wherein the base includes walls, and wherein the walls are respectively coupled to the base at sides of the walls.

6. The gas heating table of claim 5, wherein the walls are coupled to the base at supports extending from the table top.

7. The gas heating table of claim 5, wherein the walls are solid plates.

8. The gas heating table of claim 1, wherein the control actuator is a knob.

9. The gas heating table of claim 1, further comprising a cover disposed on the first depression that is configured to selectively cover the first depression.

10. A gas heating table comprising:
    a table top;
    a base extending from the table top, wherein the base includes a first depression formed into the base;
    an internal gas pipeline disposed within the base;
    a quick disconnect device ("QDD") disposed in the first depression of the base and including a QDD male end and a QDD female end, wherein one of the QDD male end and the QDD female end is coupled to the internal gas pipeline, and the other of the QDD male end and the QDD female end is coupled to an external gas supply; and
    a cover adapted to selectively cover the first depression.

* * * * *